US012612060B2

(12) United States Patent
Roberts et al.

(10) Patent No.: US 12,612,060 B2
(45) Date of Patent: Apr. 28, 2026

(54) ON-ROAD DRIVING TEST EVALUATION METHOD, VEHICLE TEST SYSTEM, AND COMPUTER READABLE STORAGE MEDIUM FOR AN ON-ROAD DRIVING TEST EVALUATION PROGRAM

(71) Applicant: HORIBA, LTD., Kyoto (JP)

(72) Inventors: Philip Roberts, Warwickshire (GB);
Kunio Tabata, Warwickshire (GB);
Steven Whelan, Warwickshire (GB);
Aaron Headley, Warwickshire (GB)

(73) Assignee: HORIBA, LTD. (JP)

( * ) Notice: Subject to any disclaimer, the term of this patent is extended or adjusted under 35 U.S.C. 154(b) by 182 days.

(21) Appl. No.: 18/275,980

(22) PCT Filed: Feb. 3, 2022

(86) PCT No.: PCT/JP2022/004271
§ 371 (c)(1),
(2) Date: Aug. 4, 2023

(87) PCT Pub. No.: WO2022/168917
PCT Pub. Date: Aug. 11, 2022

(65) Prior Publication Data
US 2024/0034339 A1 Feb. 1, 2024

(30) Foreign Application Priority Data

Feb. 5, 2021 (JP) ................................. 2021-017557
Apr. 21, 2021 (JP) ................................. 2021-071733

(51) Int. Cl.
B60W 50/04 (2006.01)
B60L 58/12 (2019.01)

(52) U.S. Cl.
CPC ........... B60W 50/045 (2013.01); B60L 58/12 (2019.02); B60W 2510/18 (2013.01)

(58) Field of Classification Search
CPC .. B60W 50/045; B60W 2510/18; B60L 58/12
See application file for complete search history.

(56) References Cited

U.S. PATENT DOCUMENTS

| | | | |
|---|---|---|---|
| 2017/0050590 A1 | 2/2017 | List et al. |
| 2017/0050644 A1 | 2/2017 | List et al. |
| 2017/0268948 A1 | 9/2017 | List et al. |

FOREIGN PATENT DOCUMENTS

| | | |
|---|---|---|
| CN | 110794810 B | 7/2020 |
| JP | 2016-001172 A | 1/2016 |

(Continued)

OTHER PUBLICATIONS

English Translation of CN110794810A Title: A Method for Integrally Testing Intelligent Driving Vehicle Author: Shu et al. Date: Jul. 28, 2020 (Year: 2020).*

(Continued)

*Primary Examiner* — Steven Vu Nguyen
(74) *Attorney, Agent, or Firm* — Brooks Kushman P.C.

(57) ABSTRACT

The present invention aims to improve the efficiency of automobile development by front loading the evaluation of an on-road driving test, and comprises a virtual evaluation step of simulating the on-road driving test using a driving environment model which models a driving environment, an operating state model which models an operating state, and a vehicle model which models the actual vehicle; a bench test evaluation step of imitating the on-road driving test by combining a part or all of the actual vehicle, a part or all of the vehicle model, a part or all of the driving environment model, and a part or all of the operating state model, and conducting a bench test of a part or all of the actual vehicle, and an on-road driving test evaluation step of conducting the on-road driving test of the actual vehicle in a real driving environment.

14 Claims, 10 Drawing Sheets

(56) References Cited

FOREIGN PATENT DOCUMENTS

Figure 1:
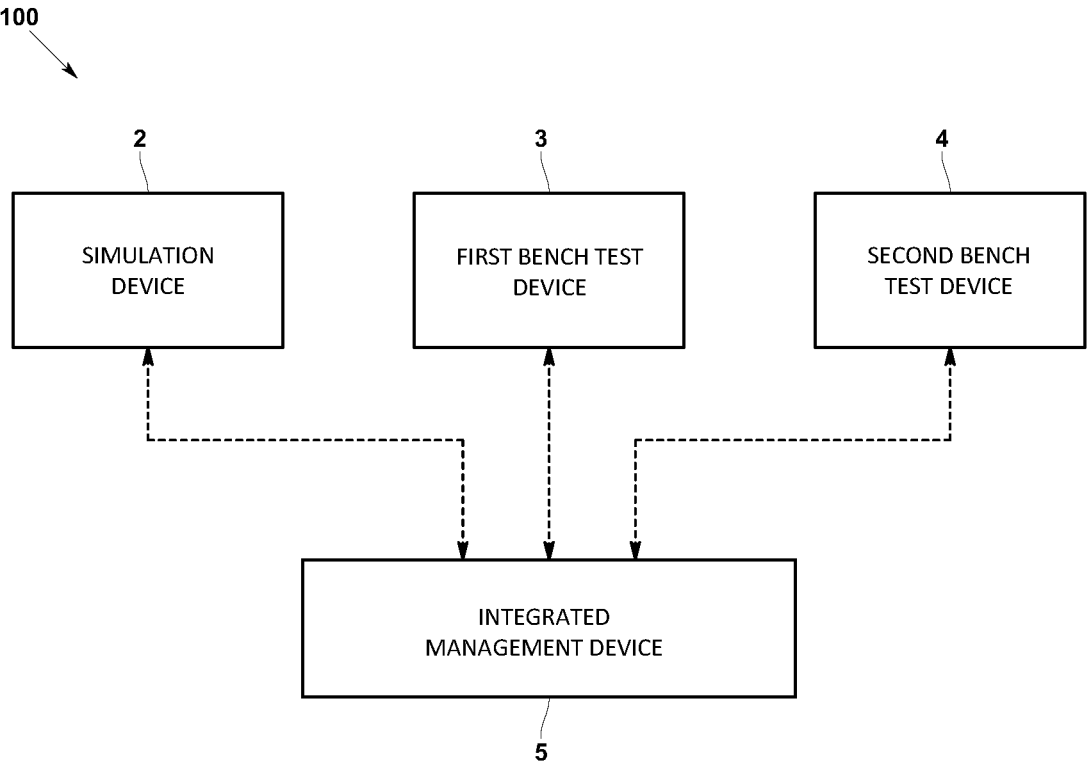

| JP | 2016-001174 A | 1/2016 |
| JP | 2019-203888 A | 11/2019 |

OTHER PUBLICATIONS

English Translation of KR20200129803A Title: Method for Optimizing Engine Management System Mapping Based on Real Road Virtual Driving Environment Author: Kang et al. Date: Nov. 18, 2020 (Year: 2020).*

English Translation of CN108562442A Title: The Actual Vehicle Running Test Device and Method Author: Fu et al. Date: Sep. 21, 2018 (Year: 2018).*

English Translation of CN106660563A Title: System and Method for Analyzing a Vehicle, in Particular a Device of Motor Vehicle of Energy Efficiency Author: List et al. Date: Dec. 10, 2019 (Year: 2019).*

EESR dated Nov. 28, 2024 issued in EP patent application No. 22749788.0.

International Search Report dated Mar. 29, 2022 issued in International application No. PCT/JP2022/004271.

Nakada, Ryo, Naganuma, Kaname, Kobayashi, Masanori "Feasibility Study of Estimation Method for Real-World Fuel Consumption by Using a Virtual Test Driving", Transactions of Society of Automotive Engineers of Japan, May 2017, vol. 48, No. 3, pp. 705-710.

* cited by examiner

2

21

22

ON-ROAD DRIVING TEST EVALUATION METHOD, VEHICLE TEST SYSTEM, AND COMPUTER READABLE STORAGE MEDIUM FOR AN ON-ROAD DRIVING TEST EVALUATION PROGRAM

CROSS-REFERENCE TO RELATED APPLICATIONS

This application is the U.S. national phase of PCT Application No. PCT/JP2022/004271, filed Feb. 3, 2022, which claims priority to Japanese Patent Application No. 2021-017557, filed Feb. 5, 2021, and Japanese Patent Application No. 2021-071733, filed Apr. 21, 2021, the disclosures of which are incorporated in their entirety by reference herein.

TECHNICAL FIELD

The present invention relates to an on-road driving test evaluation method and a vehicle test system for evaluating on-road driving tests for vehicle development to meet real-world driving requirements (for example, energy efficiency, power performance, drivability, or NVH (noise, vibration, harshness)), or for evaluating on-road driving tests for compliance with regulations such as the RDE (Real Driving Emission) test. The present invention further relates to an on-road driving test evaluation method and a vehicle test system for evaluating on-road driving tests for vehicles, including internal combustion engine vehicles (ICEV), hybrid electric vehicles (HEV), fuel cell vehicles (FCV), battery electric vehicles (BEV), or the like.

BACKGROUND ART

In recent years, on-road driving tests are conducted of energy efficiency (fuel efficiency, electricity cost, etc.), traveling distance per unit energy, etc., for vehicle development, as are on-road driving tests to ensure compliance with regulations such as the RDE test, and so on. Real-world energy efficiency is an important factor in evaluating life cycle $CO_2$ emissions, and is an important consideration when developing vehicles. Moreover, vehicles must be developed so as to satisfy realistic operating requirements as well as comply with regulations. In order to improve the efficiency of vehicle development, tests are conducted by imitating actual driving conditions or the like in test chambers.

Efforts are being made to improve the efficiency of vehicle development in conformity with on-road driving tests. For example, on-road driving tests are imitated using bench test devices such as an engine test bench, a driveline test bench, or a vehicle test bench to develop automobiles in conformity with on-road driving tests for automobile development or on-road driving tests for compliance with regulations such as the RDE test.

However, in order to imitate an on-road driving test using a bench test device as mentioned above, it is necessary to set a route model, a driving environment model, and an operating state model (driver model) or the like which comply with laws and regulations. Thus, commercially available model creation software is used to create the route model, driving environment model, and driver model. Moreover, as shown in Patent Literature 1, in an on-road exhaust gas certification test, in order to easily carry out a drive that satisfies test conditions, it has been thought of to present the driver with a driving operation style that includes at least one of the following: accelerator work, brake work, or shift work.

However, because multiple input parameters for model creation are not optimized for on-road driving test model creation in conventional model creation software, which parameters should be set and at what values to make the model compliant with on-road driving tests depends largely on the experience and skills of the model creator, and considerable effort is required to create a model that is compliant with optimal on-road driving tests.

Furthermore, the above is limited to imitating on-road driving tests using bench test devices such as engine/motor test benches, driveline test benches, or vehicle test benches and the like, and no comprehensive judgement is made which combines these test results and the test results of an actual on-road driving test.

PRIOR ART LITERATURE

Patent Literature

Patent Literature 1: JP 2019-203888 A

SUMMARY OF INVENTION

Problem to be Solved by the Invention

Therefore, the present invention has been created to solve the above problems, and its main object is to improve the efficiency of vehicle development in conformity with on-road driving tests by front-loading evaluation of an on-road driving test for vehicle development or an on-road driving test for compliance with regulations such as the RDE test.

Means for Solving the Problem

That is, an on-road driving test evaluation method according to the present invention is an on-road driving test evaluation method that evaluates an on-road driving test by conducting a bench test of a test subject which is an actual vehicle or a part thereof, and includes a virtual evaluation step of simulating the on-road driving test using a driving environment model which models a driving environment, an operating state model which models an operating state, and a vehicle model which models the actual vehicle, a bench test evaluation step of imitating the on-road driving test by combining a part or all of the actual vehicle, a part or all of the vehicle model, a part or all of the driving environment model, and a part or all of the operating state model, and conducting a bench test of a part or all of the actual vehicle, and an on-road driving test evaluation step of conducting the on-road driving test of the actual vehicle in a real driving environment.

In this way, at least three steps are performed—a virtual evaluation step, a bench test evaluation step, and an on-road driving test evaluation step—and, therefore, the validity of the driving environment model, the operating state model, and the vehicle model used in the virtual evaluation step can be verified using an evaluation result of the first bench test evaluation step, so that, regardless of the experience and skill of the creator of the model, models can be created that are compliant with on-road driving tests. Furthermore, by performing a virtual evaluation step and a bench test evaluation step, it is possible to front-load evaluation of an on-road driving test of energy efficiency, traveling distance per unit energy, etc., for vehicle development or an on-road driving test for compliance with regulations such as the RDE test. As a result, the aim to improve the efficiency of automobile development can be achieved. Furthermore, by carrying out an on-road driving test evaluation step in addition to a virtual evaluation step and a bench test evaluation step, the validity of the virtual evaluation step and the bench test evaluation step can be verified.

It is preferable that the bench test evaluation step includes a first bench test evaluation step of imitating the on-road driving test by combining a part of the actual vehicle including an engine or a motor, a part or all of the vehicle model, a part or all of the driving environment model, and a part or all of the operating state model, and conducting a bench test of a part of the actual vehicle including an engine or a motor.

In order to improve the efficiency of automobile development via an on-road driving test, it is preferable for that the bench test evaluation step further include a second bench test evaluation step, between the first bench test evaluation step and the on-road driving test evaluation step, of imitating the on-road driving test by combining the actual vehicle, a part or all of the driving environment model, and a part or all of the operating state model, and conducting a bench test of the actual vehicle.

As a specific aspect of the present invention, it is preferable that it includes at least one of the following steps: a first comparison step of comparing an evaluation result of a part of the actual vehicle including an engine or a motor in the first bench test evaluation step to an evaluation result of the vehicle model in the virtual evaluation step, a second comparison step of comparing an evaluation result of the actual vehicle in the second bench test evaluation step to an evaluation result of a part of the vehicle including an engine or a motor in the first bench test evaluation step, and a third comparison step of comparing an evaluation result of the actual vehicle in the on-road driving test evaluation step to an evaluation result of the actual vehicle in the second bench test evaluation step.

To utilize evaluation results to front-load the evaluation of an on-road driving test for vehicle development or an on-road driving test that complies with regulations such as RDE tests, etc., it is preferable to include at least one of the following steps: a first feedback step of providing feedback to the virtual evaluation step to make an evaluation result of the vehicle model in the virtual evaluation step match an evaluation result of a part of the actual vehicle including an engine or motor in the first bench test evaluation step, a second feedback step of providing feedback to the first bench test evaluation step to make an evaluation result of a part of the actual vehicle including an engine or motor in the first bench test evaluation step match an evaluation result of the actual vehicle in the second bench test evaluation step, and a third feedback step of providing feedback to the second bench test evaluation step to make an evaluation result of the actual vehicle in the second bench test evaluation step match an evaluation result of the actual vehicle in the on-road driving test evaluation step.

In an on-road driving test evaluation method of the present invention, as a specific implementation method for quantitative evaluation of internal combustion engine vehicles (ICEVs) and the like, it is desirable to carry out the on-road driving test evaluation step using a vehicle-mounted exhaust gas analysis device, and to carry out the second bench test evaluation step using a non-portable or a vehicle-mounted exhaust gas analysis device.

The detection efficiency of a particulate matter count measurement unit in a non-portable exhaust gas analysis device and that of a particulate matter count measurement unit in a vehicle-mounted exhaust gas analysis device are different from each other. Therefore, in order to accurately front-load the evaluation of an on-road driving test of efficiency, traveling distance, etc., for vehicle development, or an on-road driving test that complies with regulations such as the RDE test, it has been thought of to use a vehicle-mounted exhaust gas analysis device for the second bench test evaluation step.

However, it is time-consuming and laborious to go to the trouble of moving a vehicle-mounted exhaust gas analysis device to a test bench (test chamber) to conduct a test.

In order to solve this problem, it is preferable to carry out the second bench test evaluation step using a non-portable exhaust gas analysis device, and that the detection efficiency of the particulate matter count measurement unit of the non-portable exhaust gas analysis device be the same as the detection efficiency of the particulate matter count measurement unit of the vehicle-mounted exhaust gas analysis device be the same.

Further, in an on-road driving test evaluation method of the present invention, as a specific aspect for quantitative evaluation concerning an internal combustion engine vehicle (ICEV) and the like, it is preferable to compare an exhaust gas test result in at least two of the first bench test evaluation step, the second bench test evaluation step, and the on-road driving test evaluation step, and that the measurement component used for comparison of the exhaust gas test result is at least one of carbon dioxide ($CO_2$), carbon monoxide (CO), particulate matter (PM), a particulate matter count (PN), ammonia ($NH_3$), nitrous oxide ($N_2O$), nitrogen oxides (NOx), or total hydrocarbons (THC).

In an on-road driving test evaluation method of the present invention, as a specific aspect for quantitative evaluation concerning a battery electric vehicle (BEV) and the like, it is preferable that the on-road driving test evaluation step is carried out using a wattmeter, a voltmeter, or an ammeter for measuring electric power consumption of a battery of the actual vehicle, and the second bench test evaluation step is carried out using a wattmeter, a voltmeter, or an ammeter for measuring electric power consumption of a battery of the actual vehicle. Specifically, it is preferable that an electric power measurement result of at least two of the first bench test evaluation step, the second bench test evaluation step, and the on-road driving test evaluation step are compared.

In an on-road driving test evaluation method of the present invention, as a specific aspect for quantitative evaluation concerning a fuel cell vehicle (FCV) and the like, it is preferable that the on-road driving test evaluation step is carried out using a measurement apparatus for measuring hydrogen consumption, oxygen consumption, and/or power generation of a fuel cell of the actual vehicle, and the second bench test evaluation step is carried out using a measurement apparatus for measuring hydrogen consumption, oxygen consumption, and/or power generation of a fuel cell of the actual vehicle. Specifically, it is preferable that a measurement result of the measurement apparatus in at least two of the first bench test evaluation step, the second bench test evaluation step, and the on-road driving test evaluation step are compared.

Moreover, for carrying out quantitative evaluation concerning a fuel cell vehicle (FCV) and the like, as described above, it is also possible that the on-road driving test evaluation step is carried out using a wattmeter, a voltmeter, or an ammeter for measuring electric power consumption of a battery of the actual vehicle, and the second bench test evaluation step is carried out using a wattmeter, a voltmeter, or an ammeter for measuring electric power consumption of a battery of the actual vehicle.

Further, in an on-road driving test evaluation method of the present invention, as a specific aspect for quantitative evaluation concerning brake dust emissions of a vehicle, it is preferable that at least the second bench test evaluation step is carried out using a brake dust measurement device which measures brake dust emitted from a brake of the actual vehicle.

As for the operating state of the bench test evaluation step, it is preferable that the bench test evaluation step includes operating a part or all of the actual vehicle based on the operating state model used in the virtual evaluation step.

As for the operating state of the second bench test evaluation step, it is preferable that an operating state of the second bench test evaluation step is reproduced based on an operating state reproduced in the first bench test evaluation step, and the second bench test evaluation step is one wherein a driver operates the actual vehicle or an automatic driving robot operates the actual vehicle based on the operating state model used in the first bench test evaluation step.

As a way to realize the driving environment model in the first bench test evaluation step or the second bench test evaluation step, it is preferable that the driving environment model of the first bench test evaluation step or the second bench test evaluation step is reproduced by connecting piping to an intake side and an exhaust side of the engine and controlling pressure via the piping.

As a specific implementation of the operating state model, it is preferable that, in the virtual evaluation step, the combination of parameters forming the operating state model is associated with at least one of RPA (Relative Positive Acceleration) or vapos_[95] (Relative Positive Acceleration 95th percentile) so as to conform with an on-road driving test in compliance with regulations.

As the test subject, one which has an advanced driver assistance system (ADAS) or an automatic driving system (AD) may be considered. For a test subject having ADAS or AD, in order to front-load evaluation of an on-road driving test of energy efficiency, traveling distance per unit energy, etc., for vehicle development or an on-road driving test compliant with regulations such as RDE tests, it is preferable that the virtual evaluation step simulates the on-road driving test using, in addition to the driving environment model, the operating state model, and the vehicle model, at least one of a sensor model which models a sensor necessary for the ADAS or the AD, or an ADAS or AD model which quantifies the ADAS or the AD.

The test subject may be a hybrid vehicle in which an engine and a motor operate in cooperation with each other. For a hybrid vehicle, in order to front-load evaluation of an on-road driving test of energy efficiency, traveling distance per unit energy, etc., for vehicle development or an on-road driving test compliant with regulations such as RDE tests, it is preferable that the virtual evaluation step simulates the on-road driving test using, in addition to the driving environment model, the operating state model, and the vehicle model, a motor model which models the motor.

Furthermore, a vehicle test system according to the present invention is a vehicle test system which evaluates an on-road driving test by conducting a bench test of a test subject which is an actual vehicle or a part thereof, comprising a simulation device that simulates the on-road driving test using a driving environment model which models a driving environment, an operating state model which models an operating state, and a vehicle model which models the actual vehicle, a first bench test device which imitates the on-road driving test by combining a part of the actual vehicle including an engine or a motor, a part or all of the vehicle model, a part or all of the driving environment model, and a part or all of the operating state model, and conducting a bench test of a part of the actual vehicle including an engine or a motor, and a second bench test device which imitates the on-road driving test by combining the actual vehicle, a part or all of the driving environment model, and a part or all of the operating state model, and conducting a bench test of the actual vehicle.

An on-road driving test evaluation program according to the present invention is an on-road driving test evaluation program for evaluating an on-road driving test for vehicle development or an on-road driving test compliant with regulations by evaluating an on-road driving test by conducting a bench test of a test subject which is an actual vehicle or a part thereof, wherein the program causes a computer to simulate the on-road driving test using a driving environment model which models a driving environment, an operating state model which models an operating state, and a vehicle model which models the actual vehicle, the program causes the on-road driving test to be imitated by combining a part or all of the actual vehicle, a part or all of the vehicle model, a part or all of the driving environment model, and a part or all of the operating state model, and causing a bench test device to conduct a bench test of a part or all of the actual vehicle.

Effects of the Invention

The present invention, as discussed above, achieves the improvement of the efficiency of automobile development by front-loading evaluation of an on-road driving test of energy efficiency, traveling distance per unit energy, etc., for vehicle development or an on-road driving test for compliance with regulations such as the RDE test.

BRIEF DESCRIPTION OF DRAWINGS (FIG. 1) A schematic diagram showing a configuration of a vehicle test system according to a first embodiment of the present invention.

(FIG. 2) A schematic diagram showing a configuration of a simulation device according to the first embodiment.

(FIG. 3) A schematical diagram showing a configuration of a first bench test device according to the first embodiment.

(FIG. 4) A schematic diagram showing a configuration of a second bench test device according to the first embodiment.

(FIG. 5) A flow chart diagram of a driving test evaluation method according to the first embodiment.

(FIG. 6) A schematic diagram showing a configuration of a simulation device according to a second embodiment.

(FIG. 7) A schematic diagram showing a configuration of a first bench test device according to the second embodiment.

(FIG. 8) A schematic diagram showing a configuration of a second bench test device according to the second embodiment.

(FIG. 9) A flow chart diagram of a driving test evaluation method according to the second embodiment.

(FIG. 10) A schematic diagram showing a configuration of a simulation device according to a variation embodiment.

MODES FOR CARRYING OUT THE INVENTION

A vehicle test system and an on-road driving test evaluation method according to one embodiment of the present invention are explained below with reference to the drawings.

First Embodiment

Device Configuration of Vehicle Test System

A vehicle test system 100 of the present embodiment evaluates an on-road driving test for vehicle development or an on-road driving test for compliance with regulations by conducting a bench test on a test subject which is an actual vehicle, such as an internal combustion engine vehicle (ICEV) or the like, or a part thereof. Here, the on-road driving test for compliance with regulations is, for example, an on-road driving exhaust gas test (the RDE (Real Driving Emission) test) which has been introduced in various countries in Europe and so on.

Concretely, as shown in FIG. 1, the vehicle test system 100 includes a simulation device 2 which simulates an on-road driving test, a first bench test device 3 which imitates an on-road driving test by conducting a bench test on a part of an actual vehicle including an engine, a second bench test device 4 which imitates an on-road driving test by conducting a bench test of an actual vehicle, and a higher-level management device 5 which performs integrated management of the simulation device 2, first bench test device 3, and second bench test device 4.

The simulation device 2 simulates an on-road driving test using a driving environment model which models a driving environment, an operating state model which models an operating state, and a vehicle model which models an actual vehicle, and is a computer including a CPU, an internal memory, an input-output interface, an input means such as a keyboard or the like, an output means such as a display or the like, and a means of communication or the like.

Figure 2:
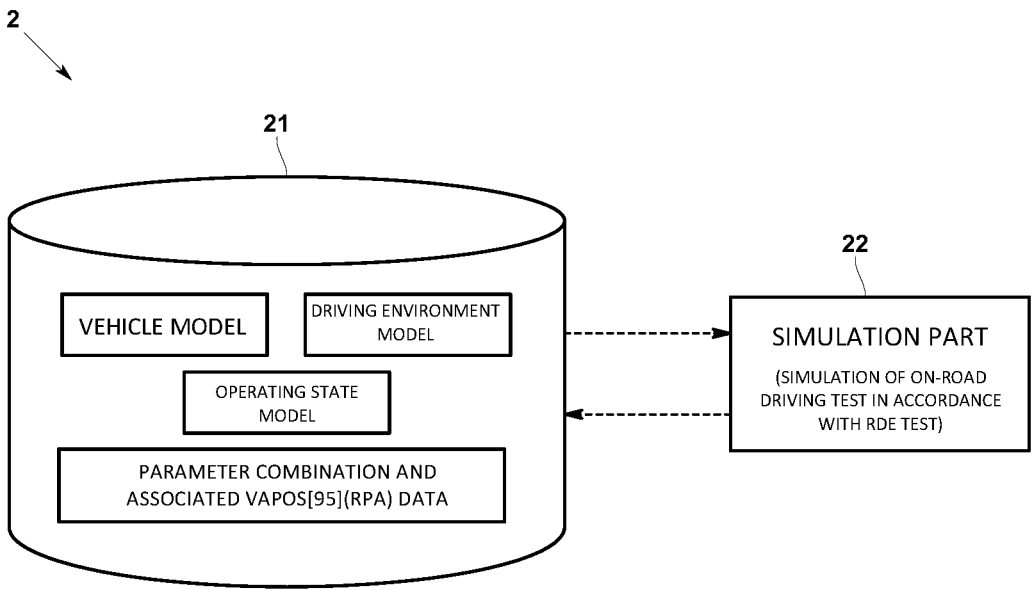

As shown in FIG. 2, the simulation device 2 includes a relational data storage unit 21 which stores each model, and a simulation part 22 which simulates a drive in compliance with an RDE test.

The driving environment model stored in the relational data storage unit 21 is a model which quantifies the driving route, road surface resistance on the driving route, signs, temperature and humidity, elevation of the driving route, and/or the degree of congestion (traffic volume) on the driving route, etc.

Furthermore, the operating state model stored in the relational data storage unit 21 is a model which quantifies dynamics (amount of work), energy efficiency, and/or nervousness.

Specifically, the operating state model includes, for example, the below parameters enumerated in IPG Automotive K.K.'s "CarMaker" software.

Dynamics Parameters: Crusing speed[km/h], Corner cutting coefficient[-], dt Change of pedals[s], Max. Long Acceleration[m/s$^2$], Max. Long Dceleration[m/s$^2$], Max. Lat Acceleration[m/s$^2$], Exponent of g-g Diagram [-], Time of Shifting[s], Engine Speeds min/mas[rpm], Engine Speeds idle up/acc. Down[rpm], and/or Long Smooth Throttle Limit[-] Energy Efficiency Parameters: Min. dt Accel/Decel[s], Long Drag Torque Braking[-], Long Drive Cycle Tol[-], and/or Long drive Cycle Coef[-]

Nervousness Parameters: Long SDV Random[-], and/or Long SDV Random f[-]

Furthermore, the vehicle model stored in the relational data storage unit 21 has at least an engine model which quantifies an engine, and it models vehicle information such as the type of the actual vehicle (truck, passenger vehicle, etc.), weight, transmission classification (MT, AT, CVT, etc.), tire diameter, gear ratio, engine characteristics (relationship between throttle opening and rotation speed to output torque, etc.), ECU control characteristics (relationship between accelerator opening and throttle opening, etc.), TCU control characteristics (conditions for gear ratio change, the timing thereof, etc.), and/or BCU control characteristics (distribution of braking force to each wheel, etc.) and so on. Each of these models is stored in relational data storage unit 21 in advance.

As the on-road driving test in compliance with an RDE test, based on each model stored in relational data storage unit 21, simulation part 22 simulates a drive in which the test results of emissions in the MAW (moving averaging window) or power binning method fall within a predetermined range.

Furthermore, in the above simulation, simulation part 22 obtains RPA (Relative Positive Acceleration) and/or vapos_[95] (Relative Positive Acceleration 95$^{th}$ percentile) of the drive in accordance with an RDE test using as input parameters multiple operating characteristics included in the operating state model.

Here, simulation part 22 creates a combination of input parameters of a plurality of operating characteristics via Design of Experiments (DoE), and using the combination pattern thus created, executes a simulation of the on-road driving test in compliance with the RDE test. Simulation part 22 then obtains RPA (Relative Positive Acceleration) and/or vapos_[95] (Relative Positive Acceleration 95$^{th}$ percentile) from the simulation result.

Furthermore, the simulation part associates the input parameter combination pattern with the respective corresponding RPA and/or vaporos_[95] and stores them in the relational data storage unit 21. This allows, by selecting the RPA and/or vapos_[95], the input parameter combination pattern (operating state model) corresponding to said RPA and/or vapos_[95] to be determined. This determined operating state model is transmitted to the first bench test device 3 and/or second bench test device 4 described below, and is used for a test using each test device 3 and 4.

Figure 3:
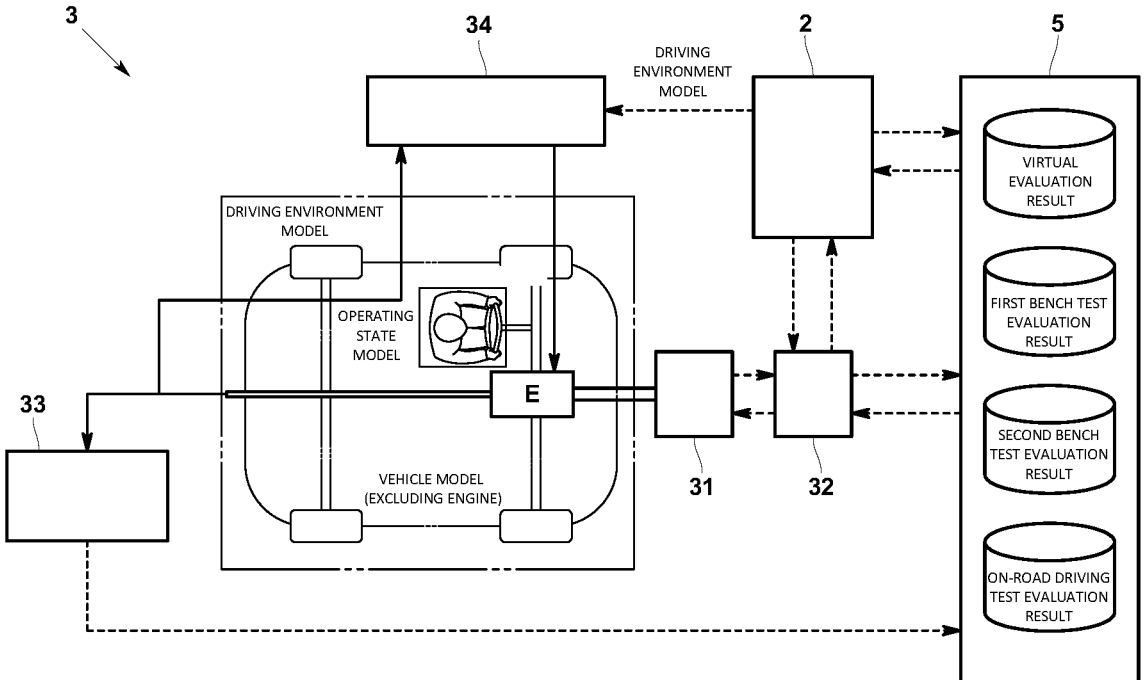

As shown in FIG. 3, the first bench test device 3 imitates an on-road driving test by combining a part of the actual vehicle which includes engine E, a vehicle model excluding said part which includes engine E, a driving environment model, and/or an operating state model, and conducting a bench test on a part of the actual vehicle including engine E. Here, the first bench test device 3 is an engine bench (engine dynamometer) which takes as its test subject engine E. Moreover, the part of the actual vehicle including its engine may be a driveline including a transmission in addition to an engine, and in this case the bench test device may be configured to use a dynamometer connected to a drive shaft of the driveline.

This first bench test device 3 includes an engine dynamometer 31 that applies a load to engine E, a control device 32 which controls the engine dynamometer 31, and an exhaust gas analysis device 33 that analyzes exhaust gas emitted from engine E and which, for example, may be non-portable.

The control device 32 controls the engine dynamometer 31 based on a vehicle model excluding the part which includes an engine, a driving environment model, and an operating state model. Further, the control device 32 operates engine E based on an operating state model generated from the simulation part 22 as described above.

Additionally, first bench test device 3 is provided with an external environment regulator 34 which regulates the surrounding environment (at least one of the temperature, pressure, or humidity) of the engine E in order to reproduce the driving environment. The external environment regulator 34 is connected to the intake side and the exhaust side of the engine by piping, and regulates pressure inside the engine via the piping, and is, for example, a portable type. The external environment regulator 34 is controlled by the control device 32 based on a driving environment model. Moreover, the configuration may be one in which a driving environment is reproduced by equipping the first bench test device 3 in an environmental test chamber in which it is possible to regulate the temperature, humidity, or pressure.

The exhaust gas analysis device 33 analyzes at least one of the following in the exhaust gas emitted from engine E: carbon dioxide ($CO_2$), carbon monoxide (CO), particulate matter (PM), a particulate matter count (PN), ammonia ($NH_3$), nitrous oxide ($N_2O$), nitrogen oxides (NOx), or total hydrocarbons (THC). The exhaust gas measurement result measured by the exhaust gas analysis device 33 is transmitted to the higher-level management device 5 or the control device 32.

Figure 4:
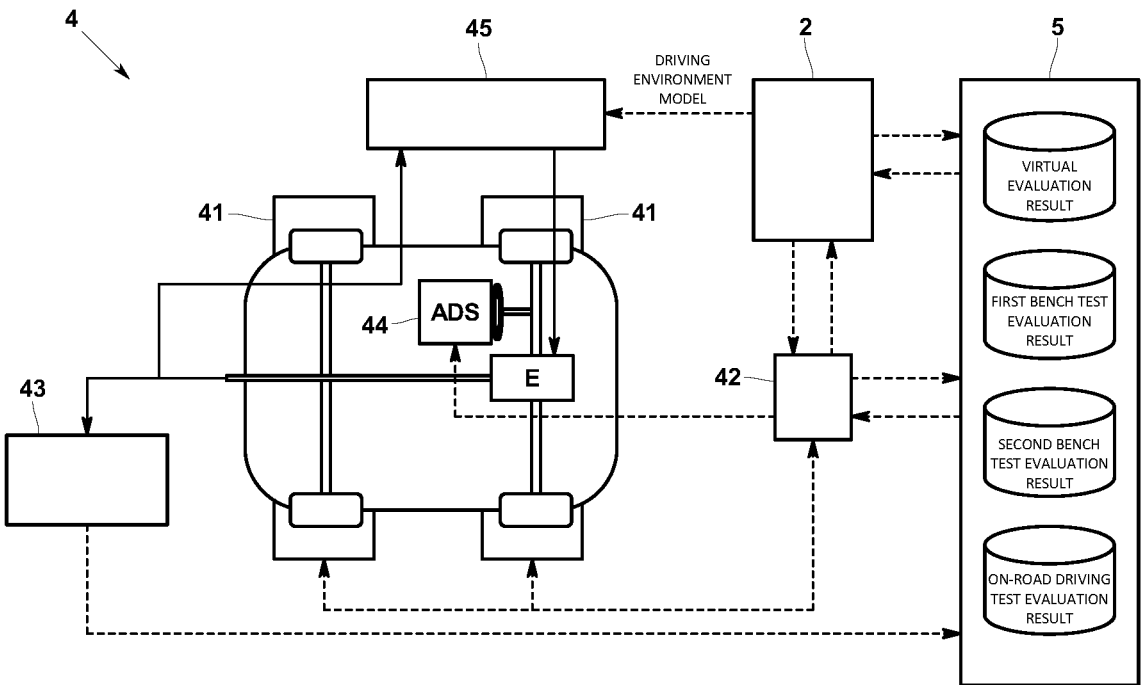

As shown in FIG. 4, the second bench test device 4 imitates an on-road driving test by combining an actual vehicle V, a driving environment model, and an operating state model, and conducting a bench test of the actual vehicle V.

This second bench test device 4 includes a chassis dynamometer (chassis bench) 41 on which the actual vehicle V is mounted, a control device 42 which controls the chassis dynamometer 41, and an exhaust gas analysis device 43 which analyzes exhaust gas emitted from the engine E and is, for example, a non-portable type or a vehicle-mounted type.

The control device 42 controls the chassis dynamometer 41 based on a driving environment model and an operating state model. Further, the control device 42 controls an automatic driving robot 44 based on an operating state model used by the first bench test device 3, and via this the automatic driving robot 44 operates the actual vehicle V. Moreover, rather than using an automatic driving robot 44, a driver (a human) may operate it instead.

Additionally, the second bench test device 4 is provided with an external environment regulator 45 which regulates the surrounding environment (at least one of the temperature, pressure, or humidity) of the engine E in order to reproduce the driving environment. The external environment regulator 45 is connected to the intake side and the exhaust side of the engine by piping, and regulates pressure inside the engine via the piping, and is, for example, a portable type. The external environment regulator 45 is controlled by the control device 42 based on a driving environment model. The external environment regulator 45 of the second bench test device 4 and the external environment regulator 34 of the first bench test device 3 may be a single one used for both purposes, or may be separately provided. Moreover, the configuration may be one in which a driving environment is reproducible by equipping the second bench test device 4 in an environmental test chamber in which it is possible to regulate the temperature, humidity, or pressure.

The exhaust gas analysis device 43 analyzes at least one of the following emitted in the exhaust gas from the engine: carbon dioxide ($CO_2$), carbon monoxide (CO), particulate matter (PM), a particulate matter count (PN), ammonia ($NH_3$), nitrous oxide ($N_2O$), nitrogen oxides (NOx), or total hydrocarbons (THC). The exhaust gas measurement result measured by the exhaust gas analysis device 43 is transmitted to the higher-level management device 5 or the control device 42. The exhaust gas analysis device 43 of the second bench test device 4 and the exhaust gas analysis device 33 of the first bench test device 3 may be a single one used for both purposes, or may be separately provided.

As shown in FIG. 2 and the like, higher-level management device 5 performs the scheduling, described below, of the on-road driving test and management of various types of data by sending and receiving data to and from the simulation device 2, the first bench test device 3, and the second bench test device 4, and is a computer including a CPU, an internal memory, an input-output interface, an input means such as a keyboard or the like, an output means such as a display or the like, and a means of communication or the like. A simulation evaluation result obtained by the simulation device 2, a first bench test evaluation result obtained by the first bench test device 3, a second bench test evaluation result obtained by the second bench test device 4, and an on-road driving test evaluation result obtained by the on-road driving test are stored in the higher-level management device 5. Moreover, the on-road driving test evaluation result is stored in the higher-level management device 5 via a transmission or a recording medium.

On-Road Driving Test Evaluation Method

Next, the on-road driving test evaluation method used by the vehicle test system of the present embodiment will be explained.

Figure 5:
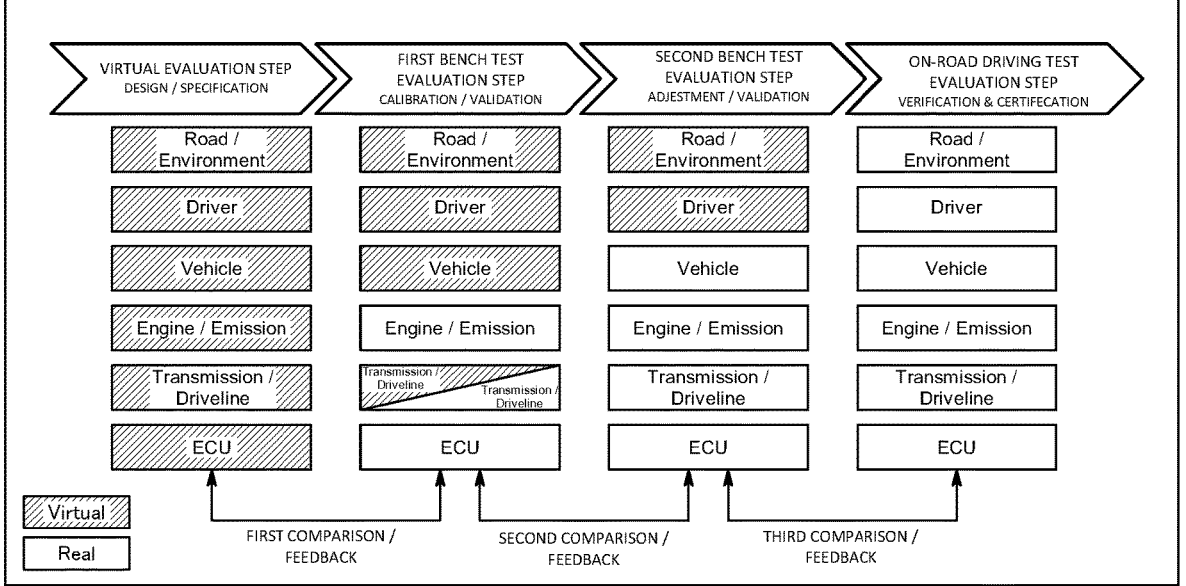

As shown in FIG. 5, an on-road driving test evaluation method according to the present embodiment includes a virtual evaluation step that simulates an on-road driving test, a first bench test evaluation step which imitates an on-road driving test by conducting a bench test on a part of an actual vehicle including an engine, a second bench test evaluation step which imitates an on-road driving test by conducting a bench test on an actual vehicle, and an on on-road driving test evaluation step which carries out an on-road driving test of an actual vehicle in a real driving environment.

The virtual evaluation step is carried out by the simulation part 22 of the simulation device 2, and simulates an on-road driving test in compliance with regulations using a driving environment model, an operating state model, and a vehicle model. In the virtual evaluation step, a combination of input parameters is created of a plurality of operating characteristics, and using the combination pattern thus created, a simulation of the on-road driving test in compliance with the RDE test is executed. Then, RPA (Relative Positive Acceleration) and/or vapos_[95] (Relative Positive Acceleration $95^{th}$ percentile) is obtained from the virtual evaluation step, and is associated with the input parameter combination pattern and stored in the relational data storage unit 21. This allows, by selecting the RPA and/or vapos_[95], the input parameter combination pattern (operating state model) corresponding to said RPA and/or vapos_[95] to be determined.

The first bench test evaluation step is carried out using the first bench test device 3, and the engine dynamometer 31 is controlled together with the operation of engine E using a simulation result obtained by the simulation device 2, and exhaust gas analysis device 33 analyzes the exhaust gas emitted at that time.

Here, in the first bench test evaluation step, by selecting an operating state model that performs an RDE drive with a chosen RPA and/or vapos_[95] identified in the virtual evaluation step, the engine E is operated based on said determined operating state model. Then, in the first bench test evaluation step, it is evaluated whether or not the test result of emissions in the MAW and/or power binning methods fall within the predetermined range. Apart from that, an evaluation of an emissions amount of measurement components in the exhaust gas measured by the exhaust gas analysis device 33 may also be performed in the first bench test evaluation step.

The second bench test evaluation step is carried out using the second bench test device 4, and the chassis dynamometer 41 is controlled together with the operation of the actual vehicle V based on the operating state model used by the first bench test device 3, and exhaust gas analysis device 43 analyzes the exhaust gas emitted at that time. Then, in the second bench test evaluation step, it is evaluated whether or not the test result of emissions in the MAW and/or power binning methods fall within the predetermined range. Apart from that, an evaluation of an emissions quantity of measurement components in the exhaust gas measured by the exhaust gas analysis device 43 may also be performed in the second bench test evaluation step.

The on-road driving test evaluation step is carried out by performing an on-road driving test on an actual vehicle in a real driving environment (on an actual road), and exhaust gas emitted by an actual vehicle driving on an actual road is analyzed by a vehicle-mounted exhaust gas analysis device. Then, in the on-road driving test evaluation step, it is evaluated whether or not the test results of emissions in the MAW and/or power binning methods fall within the predetermined range. Apart from that, an evaluation of an emissions quantity of measurement components in the exhaust gas measured by the vehicle-mounted exhaust gas analysis device may also be performed in the on-road driving test evaluation step. The vehicle-mounted exhaust gas analysis device analyzes at least one of the following emitted in the exhaust gas from the engine: carbon dioxide ($CO_2$), carbon monoxide (CO), particulate matter (PM), a particulate matter count (PN), ammonia ($NH_3$), nitrous oxide ($N_2O$), nitrogen oxides (NOx), or total hydrocarbons (THC). The exhaust gas measurement result measured by the exhaust gas analysis device 43 is transmitted to the higher-level management device 5.

The evaluation results obtained in each of the above evaluation steps can be compared with each other.

Specifically, a first comparison step can be performed in which an evaluation result of a part of an actual vehicle V which includes an engine E in the first bench test evaluation step is compared with an evaluation result of a vehicle model in the virtual evaluation step. Then, based on a comparison result of the first comparison step, a first feedback step can be performed in which feedback is carried out by, for example, changing the vehicle model or the like in the virtual evaluation step, so that the evaluation result of the vehicle model in the virtual evaluation step agrees with the evaluation result of a part of the actual vehicle including an engine in the first bench test evaluation step.

Furthermore, a second comparison step can be performed in which an evaluation result of an actual vehicle in the second bench test evaluation step is compared to an evaluation result of a part of a vehicle including an engine in a first bench test evaluation step. Then, a second feedback step can be performed in which feedback is carried out by, for example, changing the vehicle model or the like in the first bench test evaluation step, so that the evaluation result of the part of the actual vehicle including an engine in the first bench test evaluation step agrees with the evaluation result of the actual vehicle in the second bench test evaluation step. Moreover, feedback can be performed by, for example, changing the vehicle model or the like in the virtual evaluation step based on an evaluation result of the second bench test evaluation step.

Furthermore, a third comparison step can be performed in which an evaluation result of an actual vehicle in an on-road driving test evaluation step is compared to an evaluation result of an actual vehicle in a second bench test evaluation step. Then, a third feedback step can be performed in which feedback is carried out in the second bench test evaluation step, so that the evaluation result of the actual vehicle in the second bench test evaluation step matches the evaluation result of the actual vehicle in the on-road driving test evaluation step. Moreover, feedback can be performed by, for example, changing the vehicle model or the like in the virtual evaluation step or the first bench test evaluation step based on an evaluation result of the second bench test evaluation step.

Effect of the First Embodiment

According to the on-road driving test evaluation method of the present embodiment, at least three steps are performed—a virtual evaluation step, a first bench test evaluation step, and an on-road driving test evaluation step—and, therefore, the validity of the driving environment model, the operating state model, and the vehicle model used in the virtual evaluation step can be verified using an evaluation result of the first bench test evaluation step, so that, regardless of the experience and skill of the creator of the model, models can be created that are compliant with on-road driving tests. Furthermore, by performing a virtual evaluation step and a first bench test evaluation step, front-loading of an on-road driving test for vehicle development or evaluation of an on-road driving test for compliance with regulations such as the RDE test is possible. As a result, the aim to improve the efficiency of automobile development can be achieved. Furthermore, by carrying out an on-road driving test evaluation step in addition to a virtual evaluation step and a first bench test evaluation step, the validity of the virtual evaluation step and the first bench test evaluation step can be verified.

Second Embodiment

Device Configuration of Vehicle Test System

A vehicle test system 100 of the present embodiment evaluates an on-road driving test for vehicle development by conducting a bench test on a test subject which is an actual vehicle, which is a battery electric vehicle (BEV) or the like, or a part thereof.

Concretely, similarly to the first embodiment, as shown in FIG. 1, the vehicle test system 100 includes a simulation device 2 which simulates an on-road driving test, a first bench test device 3 which imitates an on-road driving test by conducting a bench test on a part of an actual vehicle including a motor, a second bench test device 4 which imitates an on-road driving test by conducting a bench test of an actual vehicle, and a higher-level management device 5 which performs integrated management of the simulation device 2, first bench test device 3, and second bench test device 4.

The simulation device 2 simulates an on-road driving test using a driving environment model which models a driving environment, an operating state model which models an operating state, and a vehicle model which models an actual vehicle, and is a computer including a CPU, an internal memory, an input-output interface, an input means such as a keyboard or the like, an output means such as a display or the like, and a means of communication or the like.

Figure 6:
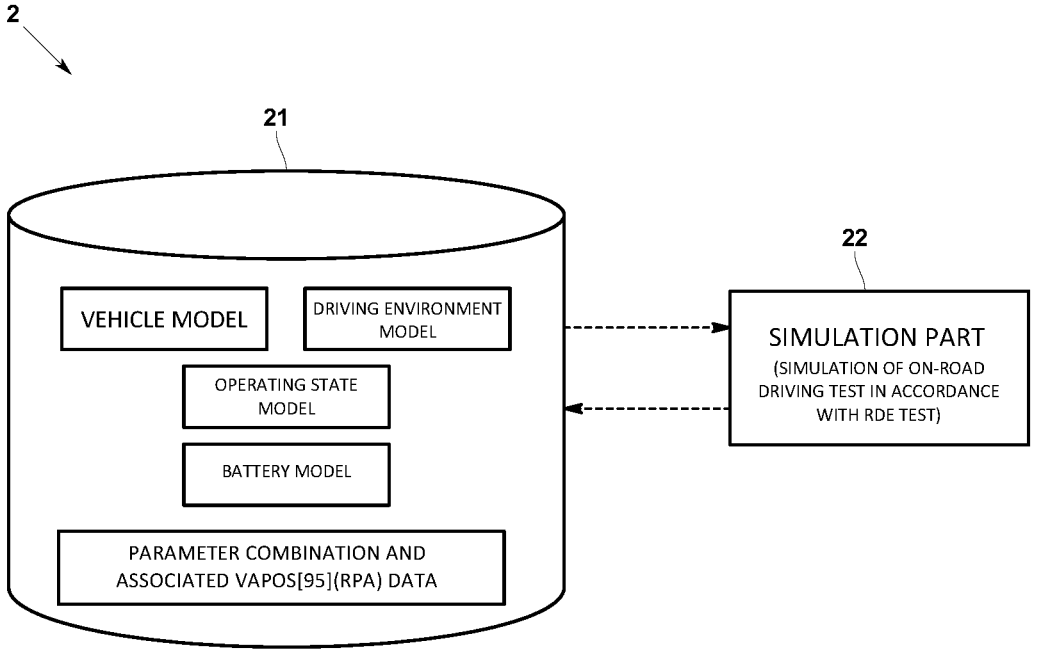

As shown in FIG. 6, the simulation device 2 includes a relational data storage unit 21 which stores each model, and a simulation part 22 which simulates a drive corresponding to an on-road driving test for vehicle development.

The driving environment model stored in the relational data storage unit 21 is a model which quantifies the driving route, road surface resistance on the driving route, signs, temperature and humidity, elevation of the driving route, and/or the degree of congestion (traffic volume) on the driving route, etc.

Furthermore, the operating state model stored in the relational data storage unit 21 is a model which quantifies dynamics (the amount of work), energy efficiency, and/or nervousness.

Specifically, the operating state model includes, for example, the below parameters enumerated in IPG Automotive KK's "CarMaker" software.

Dynamics Parameters: Crusing speed[km/h], Corner cutting coefficient[-], dt Change of pedals[s], Max. Long Acceleration[m/s²], Max. Long Dceleration[m/s²], Max. Lat Acceleration[m/s²], Exponent of g-g Diagram [-], Time of Shifting[s], Motor Speeds min/mas[rpm], and/or Motor Speeds idle up/acc. Down[rpm], Energy Efficiency Parameters: Min. dt Accel/Decel[s], Long Drag Torque Braking[-], Long Drive Cycle Tol [-], and/or Long drive Cycle Coef[-]

Nervousness Parameters: Long SDV Random[-], and/or Long SDV Random f[-]

Furthermore, the vehicle model stored in the relational data storage unit 21 has at least a motor model which quantifies a motor, and models vehicle information such as the type of the actual vehicle (truck, passenger vehicle, etc.), weight, tire diameter, motor characteristics (relationship between rotation speed and output torque, etc.), MCU control characteristics (relationship between accelerator opening and rotation speed, etc.), and/or BCU control characteristics (distribution of braking force to each wheel, etc.), etc. Each of these models is stored in relational data storage unit 21 in advance.

Furthermore, a battery model stored in the relational data storage unit 21 is a model which quantifies various parameters of a battery.

The simulation part 22 simulates a drive corresponding to an on-road driving test based on each model stored in the relational data storage unit 21.

Furthermore, in the above simulation, simulation part 22 obtains an electric power consumption amount, drivable range, and/or energy efficiency (electricity cost, etc.) and traveling distance per unit energy and the like in the case of a drive corresponding to an on-road driving test, taking as input parameters multiple operating characteristics included in an operating state model.

Here, simulation part 22 creates a combination of input parameters of a plurality of operating characteristics via Design of Experiments (DoE), and using the combination pattern thus created, executes a simulation of the on-road driving test. Furthermore, from the simulation result, simulation part 22 obtains the electric power consumption amount, drivable range, and/or energy efficiency (electricity cost, etc.) and traveling distance per unit energy and the like.

Furthermore, the simulation part associates the input parameter combination pattern with the corresponding electric power consumption amount, drivable range, and/or energy efficiency (electricity cost, etc.) and traveling distance per unit energy and the like and stores them in the relational data storage unit 21. This allows, by selecting the electric power consumption amount, drivable range, and/or energy efficiency (electricity cost, etc.) and traveling distance per unit energy and the like, the input parameter combination pattern (operating state model) corresponding to said electric power consumption amount, drivable range, and/or energy efficiency (electricity cost, etc.) and traveling distance per unit energy and the like to be determined. This determined operating state model is transmitted to the first bench test device 3 or second bench test device 4 described below, and is used for a test using each test device 3 and 4.

Figure 7:
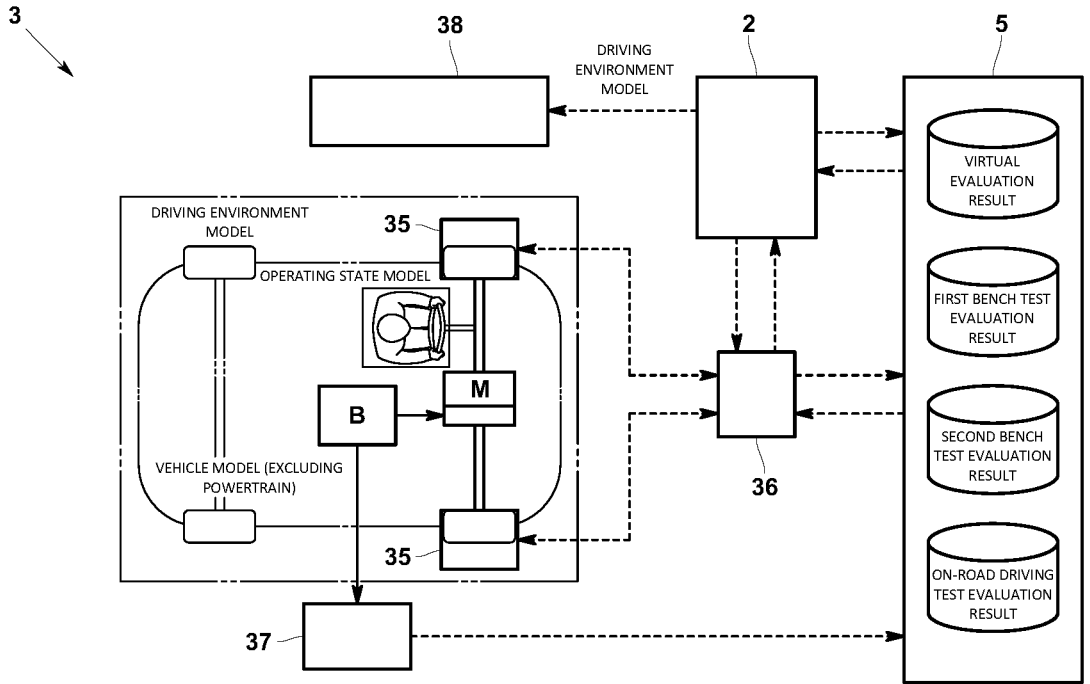

As shown in FIG. 7, as a part of the actual vehicle including the motor M, the first bench test device 3 conducts a test of a powertrain PT of an actual vehicle having a motor M and a battery B. Specifically, the first bench test device 3 imitates an on-road driving test by combining a part of the actual vehicle including a powertrain PT, a vehicle model excluding said part including a powertrain PT, a driving environment model, and/or an operating state model, and conducting a bench test of a part of the actual vehicle including a powertrain PT. Moreover, although a two-wheel drive configuration is shown in FIG. 3, a four-wheel drive configuration is also possible.

Here, the first bench test device 3 is a dynamometer connected to a drive shaft of the powertrain PT. Moreover, if the test subject is a motor M, the first bench test device 3 may be a dynamometer (motor dynamometer) connected to the motor M of the actual vehicle.

This first bench test device 3 includes a dynamometer 35 that applies a load to a draft shaft of the powertrain PT, a control device 36 which controls the dynamometer 35, and measurement apparatus 37 such as a wattmeter, voltmeter, and/or ammeter for measuring the consumed electric power of the battery B.

The control device 36 controls dynamometer 35 based on a vehicle model excluding the powertrain, a driving environment model, and an operating state model. Further, the control device 36 operates motor M based on an operating state model generated from the simulation part 22 described above. Moreover, it is also possible to have just one dynamometer 35. In this case, the vehicle parts later than motor M are substituted by the vehicle model.

Additionally, the first bench test device 3 is provided with an external environment regulator 38 which regulates the surrounding environment (at least one of the temperature, pressure, or humidity) of the powertrain PT in order to reproduce the driving environment. The external environment regulator 38 is controlled by the control device 36 based on a driving environment model. Moreover, the configuration may be one in which a driving environment is reproduced by equipping the first bench test device 3 in an environmental test chamber in which it is possible to regulate the temperature, humidity, or pressure.

The measurement apparatus 37 measures the electric power used to drive the motor M and the electric power charged by the motor M. The electric power, voltage, and/or current measured by the measurement apparatus 37 is transmitted to the higher-level management device 5 and/or the control device 32.

Figure 8:
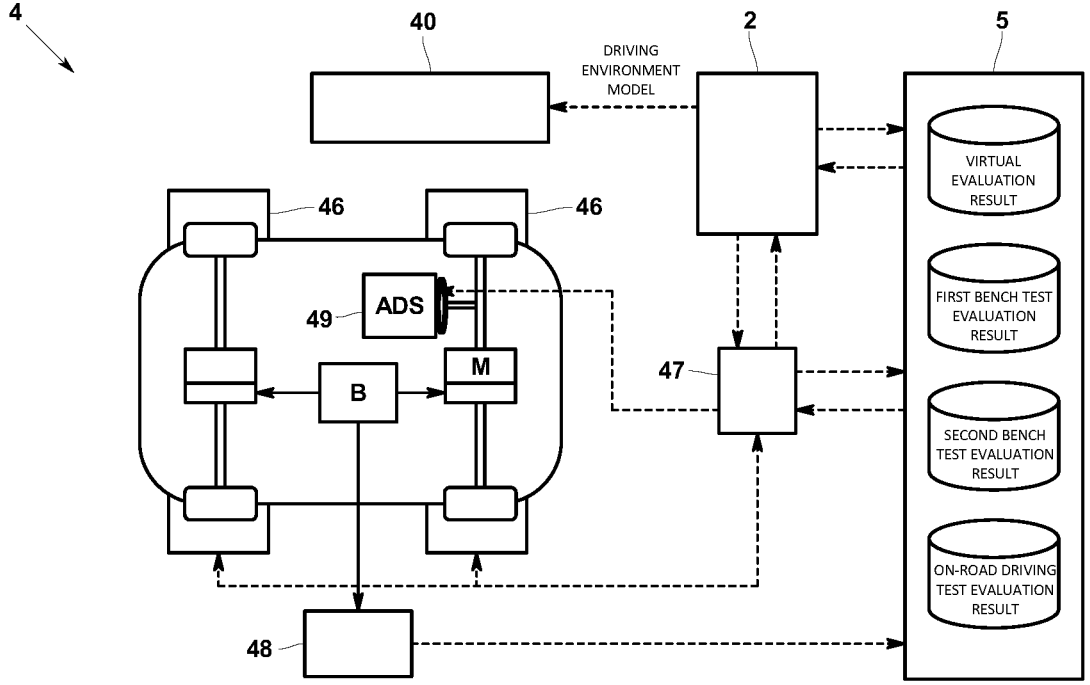

As shown in FIG. 8, the second bench test device 4 imitates an on-road driving test by combining an actual vehicle V, a driving environment model, and an operating state model, and conducting a bench test of the actual vehicle V.

This second bench test device 4 includes a chassis dynamometer 46 (a chassis bench) on which an actual vehicle V is mounted, a control device 47 which controls the chassis dynamometer 46, and a measurement apparatus 48 such as a wattmeter, voltmeter, and/or ammeter for measuring the consumed electric power of the battery B.

The control device 47 controls the chassis dynamometer 46 based on a driving environment model and an operating state model. Further, the control device 47 controls an automatic driving robot 49 based on an operating state model used by the first bench test device 3, and via this the automatic driving robot 49 operates the actual vehicle V. Moreover, rather than using an automatic driving robot 49, a driver (a human) may operate it instead.

Additionally, the second bench test device 4 is provided with an external environment regulator 40 which regulates the surrounding environment (at least one of the temperature, pressure, or humidity) of the actual vehicle in order to reproduce the driving environment. The external environment regulator 40 is controlled by the control device 47 based on a driving environment model. The external environment regulator 40 of the second bench test device 4 and the external environment regulator 38 of the first bench test device 3 may be a single one used for both purposes, or may be separately provided. Moreover, the configuration may be one in which a driving environment is reproduced by equipping the second bench test device 3 in an environmental test chamber in which it is possible to regulate the temperature, humidity, or pressure.

The measurement apparatus 48 measures the electric power used to drive the motor M and the electric power charged by the motor M. The electric power, voltage, and/or current measured by the measurement apparatus 48 is transmitted to the higher-level management device 5 and/or the control device 32. The measurement apparatus 48 of the second bench test device 4 and the measurement apparatus 37 of the first bench test device 3 may be a single one used for both purposes, or may be separately provided.

As shown in FIG. 6 and the like, higher-level management device 5 performs scheduling of the on-road driving test described below and management of various types of data by sending and receiving data to and from the simulation device 2, the first bench test device 3, and the second bench test device 4, and is a computer including a CPU, an internal memory, an input-output interface, an input means such as a keyboard or the like, an output means such as a display or the like, and a means of communication or the like. A simulation evaluation result obtained by the simulation device 2, a first bench test evaluation result obtained by the first bench test device 3, a second bench test evaluation result obtained by the second bench test device 4, and an on-road driving test evaluation result obtained by the on-road driving test are stored in the higher-level management device 5. Moreover, the on-road driving test evaluation result is stored in the higher-level management device 5 via a transmission or a recording medium.

On-Road Driving Test Evaluation Method

Next, the on-road driving test evaluation method used by the vehicle test system of the present embodiment will be explained.

Figure 9:
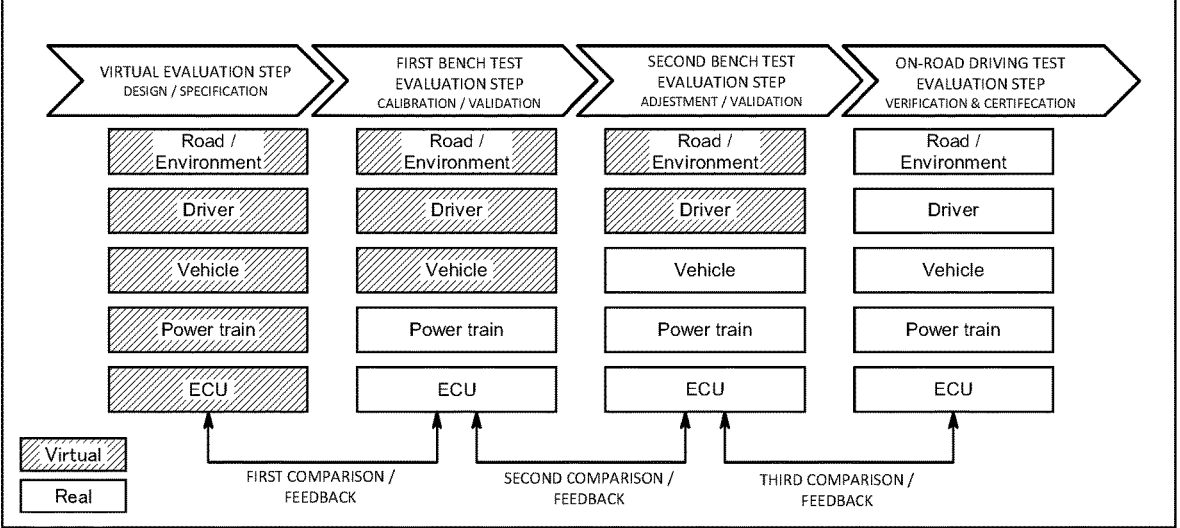

As shown in FIG. 9, an on-road driving test evaluation method according to the present embodiment includes a virtual evaluation step that simulates an on-road driving test, a first bench test evaluation step which imitates an on-road driving test by conducting a bench test on a part of an actual vehicle (here, a powertrain PT) including an motor M, a second bench test evaluation step which imitates an on-road driving test by conducting a bench test on an actual vehicle, and an on on-road driving test evaluation step which carries out an on-road driving test of an actual vehicle in a real driving environment.

The virtual evaluation step is carried out by simulation part 22 of simulation device 2, and simulates an on-road driving test suitable for vehicle development using a driving environment model, an operating state model, a vehicle model, and a battery model. In the virtual evaluation step, a combination of input parameters of a plurality of operating characteristics is created, and using the combination pattern thus created, a simulation of the on-road driving test is executed. Furthermore, for the simulation result, the electric power consumption amount, drivable range, and/or the energy efficiency (electricity cost, etc.) and traveling distance per unit energy and the like are obtained, and they are associated with the input parameter combination pattern and stored in the relational data storage unit 21. This allows, by selecting the electric power consumption amount, drivable range, or electricity cost and the like, the input parameter combination pattern (the operating state model) corresponding to said electric power consumption amount, drivable range, and/or energy efficiency (electricity cost, etc.) and traveling distance per unit energy and the like to be determined.

The first bench test evaluation step is carried out using the first bench test device 3; the chassis dynamometer 35 is controlled together with the operation of the motor M using the simulation result from the simulation device 2, and measurement apparatus 37 measures the electric power and the like at that time.

Here, in the first bench test evaluation step, by selecting the electric power consumption amount, drivable range, and/or energy efficiency (electricity cost, etc.) and traveling distance per unit energy and the like, an input parameter combination pattern (the operating state model) corresponding to said electric power consumption amount, drivable range, and/or energy efficiency (electricity cost, etc.) and traveling distance per unit energy and the like is determined, and the motor M is operated based on the determined operating state model. Then, in the first bench test evaluation step, the test result of the electric power consumption amount, drivable range, and/or energy efficiency (electricity cost, etc.) and traveling distance per unit energy and the like is evaluated.

The second bench test evaluation step is carried out using the second bench test device 4, and the chassis dynamometer 46 is controlled together with the operation of actual vehicle V based on the operating state model used by the first bench test device 3, and measurement apparatus 48 measures the electric power and the like at that time. Then, in the second bench test evaluation step, the test result of the electric power consumption amount, drivable range, and/or energy efficiency (electricity cost, etc.) and traveling distance per unit energy and the like is evaluated.

The on-road driving test evaluation step is carried out by performing an on-road driving test on an actual vehicle V in a real driving environment (that is, on an actual road), and the electric power or the like of the battery B of the actual vehicle V driving on an actual road is measured by the measurement apparatus 48. Then, in the on-road driving test evaluation step, the test result of the electric power consumption amount, drivable range, and/or energy efficiency (electricity cost, etc.) and traveling distance per unit energy and the like is evaluated. The measurement result of electric power and the like measured by the measurement apparatus 48 is transmitted to the higher-level management device 5.

The evaluation results obtained in each of the above evaluation steps can be compared with each other.

Specifically, a first comparison step can be performed in which the evaluation result of the part of the actual vehicle V including the motor M in the first bench test evaluation step is compared with the evaluation result of the vehicle model in the virtual evaluation step. Then, based on the first comparison step, a first feedback step can be performed in which feedback is carried out by, for example, changing the vehicle model or the like in the virtual evaluation step, so that the evaluation result of the vehicle model in the virtual evaluation step matches the evaluation result of the part of the actual vehicle including a motor M in the first bench test evaluation step.

Furthermore, a second comparison step can be performed in which an evaluation result of an actual vehicle in the second bench test evaluation step is compared to an evaluation result of the part of the vehicle including a motor M in the first bench test evaluation step. Then, a second feedback step can be performed in which feedback is carried out by, for example, changing the vehicle model or the like in the first bench test evaluation step, so that the evaluation result of the part of the actual vehicle including the motor M in the first bench test evaluation step agrees with the evaluation result of the actual vehicle in the second bench test evaluation step. Moreover, feedback can be performed by, for example, changing the vehicle model or the like in the virtual evaluation step based on an evaluation result of the second bench test evaluation step.

Furthermore, a third comparison step can be performed in which an evaluation result of an actual vehicle in the on-road driving test evaluation step is compared to an evaluation result of an actual vehicle in the second bench test evaluation step. Then, a third feedback step can be performed in which feedback is provided to the second bench test evaluation step, so that the evaluation result of the actual vehicle in the second bench test evaluation step matches the evaluation result of the actual vehicle in the on-road driving test evaluation step. Moreover, feedback can be performed by, for example, changing the vehicle model or the like in the virtual evaluation step or the first bench test evaluation step based on an evaluation result of the second bench test evaluation step.

Effect of the Second Embodiment

According to the on-road driving test evaluation method of the second embodiment, at least three steps are performed—a virtual evaluation step, a first bench test evaluation step, and an on-road driving test evaluation step—and, therefore, the validity of the driving environment model, the operating state model, and the vehicle model in the virtual evaluation step can be verified using an evaluation result of the first bench test evaluation step, so that, regardless of the experience and skill of the creator of the model, models can be created that conform to on-road driving tests. Furthermore, front-loading the evaluation of on-road driving test suitable for vehicle development is possible by carrying out a virtual evaluation step and a first bench test evaluation step. As a result, the aim to improve the efficiency of automobile development can be achieved. Furthermore, by carrying out an on-road driving test evaluation step in addition to a virtual evaluation step and a first bench test evaluation step, the validity of the virtual evaluation step and the first bench test evaluation step can be verified.

Additional Variation Embodiments

Moreover, the present invention is not limited to only each of the above-described embodiments.

For example, the on-road driving test evaluation method of each of the above-described embodiments is a method having a second bench test evaluation step, but a method which does not include a second bench test evaluation step is also possible.

Furthermore, the on-road driving test evaluation method of each of the above-described embodiments can be a method which includes either one of the first bench test evaluation step or the second bench test evaluation step between the virtual evaluation step and the on-road driving test evaluation step.

Furthermore, in each of the above-described in embodiments, the first bench test device 3 or the second bench test device 4 may comprise a brake dust measurement device which measures dust which is scattered by the brakes (brake dust). This configuration enables the evaluation of environmental effects and the like of brake wear and fine particle dispersal caused by wear during an on-road driving test in the bench test evaluation step.

Furthermore, in each of the above-described embodiments, the first bench test device 3 or the second bench test device 4 may comprise a measurement apparatus which measures NVH (noise, vibration, harshness) of the test subject. This configuration enables the evaluation of the noise, vibration, or harshness of the test subject during an on-road driving test in the bench test evaluation step.

If a particulate matter count (PN) is measured in the first embodiment, a particulate matter count measurement unit may be included together with the non-portable exhaust gas analysis device and the vehicle-mounted exhaust gas analysis device. Here, a difference in PN counting efficiency my occur between the non-portable exhaust gas analysis device and the vehicle-mounted exhaust gas analysis device. For example, the PN detection efficiency of the non-portable particulate matter count measurement unit may set to be able to measure particles of a smaller particle diameter than the PN detection efficiency of the vehicle-mounted particulate matter count measurement unit. Moreover, for example, a laser scattering condensation particle counter (CPC) may be used for the particulate matter count measurement unit. The PN detection efficiency is generally defined as the number of particles of a given diameter (e.g., set at 23 nm, 10 nm, etc.) with a detection efficiency of 50%.

In the first bench test evaluation step (first bench test device 3) or the second bench test evaluation step (second bench test device 4), it is preferable to use a non-portable particulate matter count measurement unit calibrated to a PN detection efficiency equivalent to that of the vehicle-mounted particulate matter count measurement unit.

In the examples described above, in the first bench test device (first bench test device 3) or the second bench test device (second bench test device 4), a non-portable exhaust gas analysis device is shown as an example, but a vehicle-mounted exhaust gas analysis device may also be used.

For example, it may be configured such that the PN detection efficiency can be switched between a PN detection efficiency wherein the non-portable particulate matter count measurement unit is set to be able to measure particles of a smaller particle diameter than the PN detection efficiency of the vehicle-mounted particulate matter count measurement unit, and a PN detection efficiency equivalent to that of the vehicle-mounted particulate matter count measurement unit, and it may be possible to switch between a test on a chassis dynamometer (for example, WLCT) and a test imitating a on-road driving test.

Figure 10:
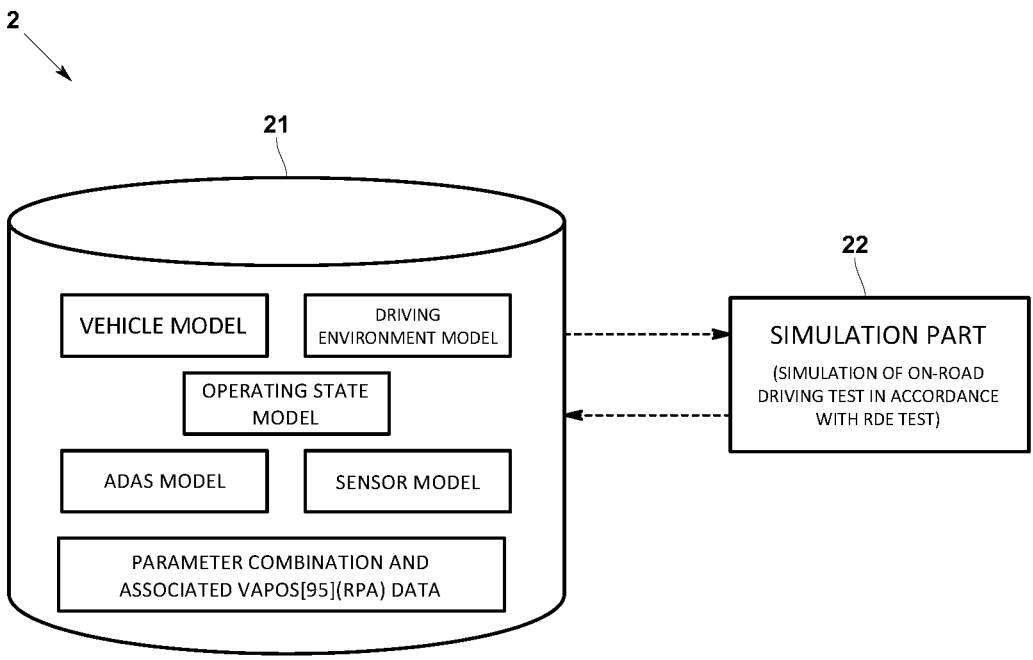

Furthermore, the test subject of each of the above embodiments may be equipped with an advanced driver assistance system (ADAS) or an automatic driving system (AD). If so, as shown in FIG. 10, various sensor models that quantify the various sensors (e.g., radar, lidar, or camera) required for advanced driver assistance systems (ADAS) or automatic driving system (AD), and at least one of an ADAS model or an AD model which quantifies the ADAS system or AD system is stored in relational data storage unit 21. Furthermore, the driving environment model should also include a model which quantifies the presence or absence of other vehicles, the difference in speed from the vehicle in front, etc. Then, the operating state model, sensor model and ADAS model (or AD model) may be coordinated to perform the on-road driving test evaluation method of an above embodiment based on a driving scenario based on the driving environment model. This configuration enables the evaluation of an on-road driving test of a test subject which has ADAS or AD. Especially, it is possible to evaluate vehicle behavior when switching from driver operation to automatic operation or from automatic operation to driver operation. Furthermore, for example, in the second bench test evaluation step, the test subject may include various sensors (e.g., radar, lidar, or cameras), and the various sensors of the test subject may be given environmental information contained in, for example, a driving environment model, and the various sensors in an on-road driving test may be evaluated. In this case, the second bench test device 4 may include a testing apparatus which provides environmental information (for example, road information such as traffic signals, intersections, etc.; or obstacle information such as the presence or absence of vehicles ahead, or the presence or absence of bicycles and pedestrians) to various sensors of the test subject.

Furthermore, the test subject of the first embodiment was an engine vehicle, but it may also be a hybrid vehicle in which an engine and a motor work together cooperatively. In this case, in addition to an engine model, a motor model which quantifies a motor is stored in the relational data storage unit 21, and the on-road driving test evaluation method of the above-described embodiment may be carried out using the motor model in addition to each model of the above-described embodiment. In addition, the driving state of a hybrid vehicle varies according to the state of charge (SOC) of the battery, and the emission of exhaust gas also varies. Therefore, a battery model which quantifies various parameters of a battery of a hybrid vehicle is stored in the relational data storage unit 21, and the on-road driving test evaluation method of the above-described embodiment may be carried out using the battery model in addition to each model of the above-described embodiment.

Furthermore, the second embodiment was a battery electric vehicle (BEV), but it could also be applied to a fuel cell vehicle (FCV). In this case, a fuel cell model which quantifies a fuel cell and/or a battery model which quantifies a battery is stored in the relational data storage unit 21, and the on-road driving test evaluation method of the above-described embodiment may be carried out using the fuel cell model and the battery model in addition to each model of the above-described embodiment. Furthermore, the first bench test device 3 and the second bench test device 4 may have a measurement apparatus which measures hydrogen consumption, oxygen consumption and/or power generation, etc., of the fuel cell FC of the fuel cell vehicle. Furthermore, in the on-road driving test evaluation step, hydrogen consumption, oxygen consumption and/or power generation, etc., of the fuel cell FC may also be measured using the measurement apparatus. Then, the measurement results in at least any two of the first bench test evaluation step, the second bench test evaluation step and the on-road driving test evaluation step are compared.

Additionally, in the above-described embodiment, evaluation of the on-road driving test can also be front-loaded to the test engine or motor which is the test subject using only the simulation device 2 and the first bench test device 3 of FIG. 1. Furthermore, evaluation of the on-road driving test can also be front-loaded to the driveline of the powertrain or the like which is the test subject using only the simulation device 2 and the second bench test 4 of FIG. 1.

The above-described sensor model, ADAS model, AD model, or battery model or the like may be included in the vehicle model as a part of the vehicle model.

Moreover, in the bench evaluation test step, when combining a part or all of the actual vehicle with a part or all of the vehicle model and conducting a test, a part or all of the actual vehicle and a part or all of the vehicle model may overlap, and a part of the actual vehicle or a part of the vehicle model may be omitted. Furthermore, in the bench evaluation test step, all or a part of the driving environment model may be used, and all or a part of the operating state model may be used.

On top of that, in the simulation device 2, the simulation may be done additionally using an exhaust gas emissions model.

In addition, in the on-road driving test evaluation method, fuel consumption can be added to the items to be evaluated.

As for the on-road driving test in compliance with regulations, it is not limited to an RDE test, and it may be any of the various road tests prescribed by the laws or rules of each country.

Various other variations and combinations of embodiments may be carried out as long as they do not contradict the purpose of the present invention.

INDUSTRIAL APPLICABILITY

According to the present invention, by front-loading the evaluation of the on-road driving test, it is possible to improve the efficiency of automobile development.

EXPLANATION OF REFERENCE NUMBERS

100: vehicle test system
2: simulation device
3: first bench test device
4: second bench test device

The invention claimed is:

1. An on-road driving test evaluation method that evaluates an on-road driving test by conducting a bench test of a test subject which is an actual vehicle or a part thereof, comprising:

a virtual evaluation step of simulating the on-road driving test using a driving environment model which models a driving environment, an operating state model which models an operating state, and a vehicle model which models the actual vehicle;

a bench test evaluation step of imitating the on-road driving test by combining a part or all of the actual vehicle, a part or all of the vehicle model, a part or all of the driving environment model, and a part or all of the operating state model, and conducting a bench test of a part or all of the actual vehicle, wherein the bench test evaluation step comprises a first bench test evaluation step of imitating the on-road driving test by combining the part or all of the actual vehicle including an engine or a motor, the part or all of the vehicle model, the part or all of the driving environment model, and the part or all of the operating state model, and conducting a bench test of the part of the actual vehicle including the engine or the motor;

an on-road driving test evaluation step of conducting the on-road driving test of the actual vehicle in a real driving environment, wherein the bench test evaluation step further comprises a second bench test evaluation step, between the first bench test evaluation step and the on-road driving test evaluation step, of imitating the on-road driving test by combining the actual vehicle, the part or all of the driving environment model, and the part or all of the operating state model, and conducting a bench test of the actual vehicle; and at least one of the following steps:

a first feedback step of providing feedback to the virtual evaluation step to make an evaluation result of the vehicle model in the virtual evaluation step match an evaluation result of the part of the actual vehicle including the engine or the motor in the first bench test evaluation step, a second feedback step of providing feedback to the first bench test evaluation step to make an evaluation result of the part of the actual vehicle including the engine or the motor in the first bench test evaluation step match an evaluation result of the actual vehicle in the second bench test evaluation step, and a third feedback step of providing feedback to the second bench test evaluation step to make an evaluation result of the actual vehicle in the second bench test evaluation step match an evaluation result of the actual vehicle in the on-road driving test evaluation step.

2. The on-road driving test evaluation method according to claim 1, comprising at least one of the following steps:

a first comparison step of comparing an evaluation result of the part of the actual vehicle including the engine or the motor in the first bench test evaluation step to an evaluation result of the vehicle model in the virtual evaluation step, a second comparison step of comparing an evaluation result of the actual vehicle in the second bench test evaluation step to an evaluation result of the part of the vehicle including the engine or the motor in the first bench test evaluation step, and a third comparison step of comparing an evaluation result of the actual vehicle in the on-road driving test evaluation step to an evaluation result of the actual vehicle in the second bench test evaluation step.

3. The on-road driving test evaluation method according to claim 1, wherein the on-road driving test evaluation step is carried out using a wattmeter, a voltmeter, and/or an ammeter for measuring electric power consumption of a battery of the actual vehicle, and the second bench test evaluation step is carried out using a wattmeter, a voltmeter, and/or an ammeter for measuring electric power consumption of a battery of the actual vehicle.

4. The on-road driving test evaluation method according to claim 3, wherein an electric power measurement result of at least two of the first bench test evaluation step, the second bench test evaluation step, and the on-road driving test evaluation step are compared.

5. The on-road driving test evaluation method according to claim 1, wherein the on-road driving test evaluation step is carried out using a measurement apparatus for measuring hydrogen consumption, oxygen consumption, and/or power generation of a fuel cell of the actual vehicle, and the second bench test evaluation step is carried out using a measurement apparatus for measuring hydrogen consumption, oxygen consumption, and/or power generation of a fuel cell of the actual vehicle.

6. The on-road driving test evaluation method according to claim 1, wherein at least the second bench test evaluation step is carried out using a brake dust measurement device which measures brake dust emitted from a brake of the actual vehicle.

7. The on-road driving test evaluation method according to claim 1, wherein the bench test evaluation step includes operating the part or all of the actual vehicle based on the operating state model used in the virtual evaluation step.

8. The on-road driving test evaluation method according to claim 1, wherein an operating state of the second bench test evaluation step is reproduced based on an operating state reproduced in the first bench test evaluation step, and the second bench test evaluation step is one wherein a driver operates the actual vehicle or an automatic driving robot operates the actual vehicle based on the operating state model used in the first bench test evaluation step.

9. The on-road driving test evaluation method according to claim 1, wherein the driving environment model of the first bench test evaluation step or the second bench test evaluation step is reproduced by connecting piping to an intake side and an exhaust side of the engine and controlling pressure via the piping.

10. The on-road driving test evaluation method according to claim 1, wherein, in the virtual evaluation step, a combination of parameters forming the operating state model is associated with at least one of RPA (Relative Positive Acceleration) or vapos_[95] (Relative Positive Acceleration 95th percentile) so as to conform with an on-road driving test in compliance with regulations.

11. The on-road driving test evaluation method according to claim 1, wherein the test subject has an advanced driver assistance system (ADAS) or an automatic driving system (AD), and the virtual evaluation step simulates the on-road driving test using, in addition to the driving environment model, the operating state model, and the vehicle model, at least one of a sensor model which models a sensor necessary for the ADAS or the AD, or an ADAS or AD model which quantifies the ADAS or the AD.

12. The on-road driving test evaluation method according to claim 1, wherein the test subject is one in which the engine and the motor operate in cooperation which each other, and the virtual evaluation step simulates the on-road driving test using, in addition to the driving environment model, the operating state model, and the vehicle model, a motor model which models the motor.

13. A vehicle test system which evaluates an on-road driving test by conducting a bench test of a test subject which is an actual vehicle or a part thereof, comprising:

a simulation device that simulates the on-road driving test using a driving environment model which models a driving environment, an operating state model which models an operating state, and a vehicle model which models the actual vehicle;

a first bench test device which imitates the on-road driving test by combining a part or all of the actual vehicle including an engine or a motor, a part or all of the vehicle model, a part or all of the driving environment model, and a part or all of the operating state model, and conducting a bench test of the part of the actual vehicle including the engine or the motor;

a second bench test device which imitates the on-road driving test by combining the actual vehicle, the part or all of the driving environment model, and the part or all of the operating state model, and conducting a bench test of the actual vehicle; and a higher-level management device, including a CPU, an internal memory, and an input-output interface, which controls the first bench test device and the second bench test device to imitate the on-road driving test, wherein the first bench test device is configured to, under control of the higher-level management device, provide feedback to the simulation device to make an evaluation result of the vehicle model used in simulation match an evaluation result of the part of the actual vehicle including the engine or the motor used by the first bench test device, or the second bench test device is configured to, under control of the higher-level management device, provide feedback to the first bench test device to make an evaluation result of the part of the actual vehicle including the engine or the motor used by the first bench test device match an evaluation result of the actual vehicle used by the second bench test device.

14. An on-road driving test evaluation method that evaluates an on-road driving test by conducting a bench test of a test subject which is an actual vehicle or a part thereof, comprising:

a virtual evaluation step of simulating the on-road driving test using a driving environment model which models a driving environment, an operating state model which models an operating state, and a vehicle model which models the actual vehicle;

a bench test evaluation step of imitating the on-road driving test by combining a part or all of the actual vehicle, a part or all of the vehicle model, a part or all of the driving environment model, and a part or all of the operating state model, and conducting a bench test of the part or all of the actual vehicle;

an on-road driving test evaluation step of conducting the on-road driving test of the actual vehicle in a real driving environment;

a comparison step of comparing an evaluation result of the part or all of the actual vehicle in the bench test evaluation step with an evaluation result of the vehicle model in the virtual evaluation step, or comparing an evaluation result of the actual vehicle in the on-road driving test evaluation step with an evaluation result of the part or all of the actual vehicle in the bench test evaluation step; and a feedback step of providing feedback to the virtual evaluation step to make an evaluation result of the vehicle model in the virtual evaluation step match an evaluation result of the part or all of the actual vehicle in the bench test evaluation step, or providing feedback to the bench test evaluation step to make an evaluation result of the part or all of the actual vehicle in the bench test evaluation step match an evaluation result of the actual vehicle in the on-road driving test evaluation step.

* * * * *